USOO9679724B2

(12) United States Patent
Abrahamsen et al.

(10) Patent No.: US 9,679,724 B2
(45) Date of Patent: Jun. 13, 2017

(54) COMPONENT FOR ELECTRIC POWER SYSTEM, AND CONTACT ASSEMBLY AND OPEN AIR ARCING ELIMINATION METHOD THEREFOR (71) Applicant: EATON CORPORATION, Cleveland, OH (US)

(72) Inventors: Michael Howard Abrahamsen, Greenwood, SC (US); Daniel Garett Sims, Newberry, SC (US); Matthew Stephen Weidemeier, Pewaukee, WI (US); Robert Kirkland Smith, Ithaca, NY (US); Hongbin Wang, Novi, MI (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/797,540

(22) Filed: Jul. 13, 2015

(65) Prior Publication Data
US 2017/0018381 A1 Jan. 19, 2017

(51) Int. Cl.
*H01H 33/666* (2006.01)
*H01H 33/12* (2006.01)
*H02B 13/035* (2006.01)

(52) U.S. Cl.
CPC ........ *H01H 33/666* (2013.01); *H01H 33/128* (2013.01); *H01H 33/6661* (2013.01); *H02B 13/0354* (2013.01)

(58) Field of Classification Search
CPC H01H 9/08; H01H 9/10; H01H 9/106; H01H 33/666; H01H 33/6661;
(Continued)

(56) References Cited

U.S. PATENT DOCUMENTS 2,480,622 A    8/1949   Warnock
2,773,154 A * 12/1956   Williams ............. H01H 33/126
                                                                                                                                                      200/558
(Continued)

FOREIGN PATENT DOCUMENTS

CN    1 148 255 A    4/1997
EP    2 575 155 A1   4/2013
GB    1 126 362 A    9/1968

OTHER PUBLICATIONS

European Patent Office, "International Search Report and Written Opinion" (Corresponding PCT/US2016/041688) Sep. 19, 2016, 13 pp.

*Primary Examiner* — Renee Luebke
*Assistant Examiner* — William Bolton
(74) *Attorney, Agent, or Firm* — Eckert Seamans; John Powers; Philip Levy (57) ABSTRACT A contact assembly for an electrical component includes: a bus member; and a switching assembly structured to move between first and second positions. The switching assembly includes: a stationary contact extending from the bus member, a movable contact engaging the stationary contact when the switching assembly is in the first position and disengaging the stationary contact when the switching assembly moves toward the second position, and a switching device coupled to the bus member. When the switching assembly is in the first position, the switching device and the stationary contact are electrically connected in parallel with the bus member and the movable contact. When the switching assembly moves from the first position toward the second position, the switching device disconnects power after the movable contact disengages the stationary contact in order that electrical disconnection between the bus member and the movable contact occurs within the switching device.

12 Claims, 6 Drawing Sheets (58) Field of Classification Search
CPC .. H01H 33/125; H01H 33/128; G02B 6/0005; F21V 33/0076; H02B 13/0354
USPC ......... 218/140, 14, 20, 48, 75, 78, 120, 154; 200/48 KB, 146 R, 554
See application file for complete search history.

(56) References Cited

U.S. PATENT DOCUMENTS

| | | | | |
|---|---|---|---|---|
| 2,835,768 | A * | 5/1958 | Mittelstadt | H01H 9/08 200/48 R |
| 3,671,696 | A | 6/1972 | Brunner | |
| 3,701,866 | A * | 10/1972 | Miller | H01H 3/42 218/10 |
| 3,772,489 | A * | 11/1973 | Wilson | H02B 11/133 200/400 |
| 3,824,359 | A * | 7/1974 | Date | H01H 33/6661 218/10 |
| 4,293,834 | A | 10/1981 | Date et al. | |
| 4,484,046 | A | 11/1984 | Neuhouser | |
| 5,041,808 | A | 8/1991 | Erickson | |
| 5,155,315 | A | 10/1992 | Malkin et al. | |
| 5,168,139 | A | 12/1992 | Bettge et al. | |
| 6,156,989 | A * | 12/2000 | Miller | H01H 33/666 218/120 |
| 8,581,135 | B2 * | 11/2013 | Piccoz | H01H 33/126 218/140 |
| 2010/0102035 | A1 * | 4/2010 | Piccoz | H01H 33/6661 218/140 |
| 2012/0187090 | A1 * | 7/2012 | Grosjean | H01H 33/6661 218/140 |

* cited by examiner

COMPONENT FOR ELECTRIC POWER SYSTEM, AND CONTACT ASSEMBLY AND OPEN AIR ARCING ELIMINATION METHOD THEREFOR

BACKGROUND

Field

The disclosed concept pertains generally to components such as, for example, load break switches, for electric power systems. The disclosed concept further pertains to contact assemblies for components of electric power systems. The disclosed concept also pertains to methods of eliminating open air arcing within components of electric power systems.

Background Information

Electric power systems incorporate switches for control and protection purposes. Some medium voltage load interrupter switchgear, for example, includes a spring operated mechanical switch and a set of protective fuses. The function of the switch is to open and close a medium voltage circuit. Interruption of current flow in the buses of the switchgear by the switch creates an arc as the contacts of the switch open. It is common for some switches, such as load break switches, to use an arc chute, and a small "flicker blade" to extinguish any arcing in open air in the event that the load break switch opens while current is flowing.

The flicker blade is a relatively small current carrying member that is spring loaded, and upon opening it whips through the arc chute material drawing an arc, and the arc is extinguished by gas produced by the flicker blade passing through the arc chute material. This method of extinguishing the arc often results in the flicker blade wearing on the movable contact of the load break switch, undesirably shortening the life of the movable contact. Additionally, open air arcing presents safety risks to operators near the load break switch in the event of a fault condition.

There is thus room for improvement in components for electric power systems and in contact assemblies therefor.

There is also room for improvement in methods of eliminating open air arcing within components of electric power systems.

SUMMARY

These needs and others are met by embodiments of the disclosed concept, which are directed to a component for an electric power system, and contact assembly and open air arcing elimination method therefor, which advantageously allows electrical disconnection during opening of the component to occur within a switching device in parallel with a stationary contact, rather than the junction between a movable contact and the stationary contact.

In accordance with one aspect of the disclosed concept, a contact assembly for a component of an electric power system is provided. The component includes a mounting assembly having a mounting member. The contact assembly comprises: a bus member structured to be coupled to the mounting member; and a switching assembly structured to move between a first position corresponding to power being connected and a second position corresponding to power being disconnected, the switching assembly comprising: a stationary contact extending from the bus member, a movable contact structured to engage the stationary contact when the switching assembly is in the first position and disengage the stationary contact when the switching assembly moves toward the second position, and a switching device coupled to the bus member. When the switching assembly is in the first position, the switching device and the stationary contact are electrically connected in parallel with the bus member and the movable contact. When the switching assembly moves from the first position toward the second position, the switching device disconnects power after the movable contact disengages the stationary contact in order that electrical disconnection occurs within the switching device.

In accordance with another aspect of the disclosed concept, a component for an electric power system is provided. The component comprises: a mounting assembly including at least one mounting member; and at least one contact assembly comprising: a bus member coupled to the mounting member, and a switching assembly structured to move between a first position corresponding to power being connected and a second position corresponding to power being disconnected, the switching assembly comprising: a stationary contact extending from the bus member, a movable contact structured to engage the stationary contact when the switching assembly is in the first position and disengage the stationary contact when the switching assembly moves toward the second position, and a switching device coupled to the bus member. When the switching assembly is in the first position, the switching device and the stationary contact are electrically connected in parallel with the bus member and the movable contact. When the switching assembly moves from the first position toward the second position, the switching device disconnects power after the movable contact disengages the stationary contact in order that electrical disconnection occurs within the switching device.

In accordance with another aspect of the disclosed concept, a method of eliminating open air arcing within a component of an electric power system is provided. The component includes a mounting member and a contact assembly. The contact assembly has a bus member and a switching assembly, the bus member being coupled to the mounting member. The switching assembly includes a stationary contact extending from the bus member, a movable contact, and a switching device coupled to the bus member. The method comprises the steps of: mechanically engaging the movable contact with the stationary contact; electrically connecting the switching device and the stationary contact in parallel with the bus member and the movable contact; responsive to a trip condition, disengaging the movable contact from the stationary contact; and disconnecting power with the switching device after the movable contact disengages the stationary contact in order that electrical disconnection occurs within the switching device.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

For purposes of the description hereinafter, directional phrases used herein such as, for example, "clockwise," "counterclockwise," "up," "down," and derivatives thereof shall relate to the disclosed concept, as it is oriented in the drawings. It is to be understood that the specific elements illustrated in the drawings and described in the following specification are simply exemplary embodiments of the disclosed concept. Therefore, specific orientations and other physical characteristics related to the embodiments disclosed herein are not to be considered limiting with respect to the scope of the disclosed concept.

As employed herein, the term "number" shall mean one or an integer greater than one (i.e., a plurality).

As employed herein, the term "conductive member" shall mean a member, such as a copper conductor, an aluminum conductor, a suitable metal conductor, or other suitable material or object that permits an electric current to flow easily.

As employed herein, the statement that two or more parts are "connected" or "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

Figure 1A:
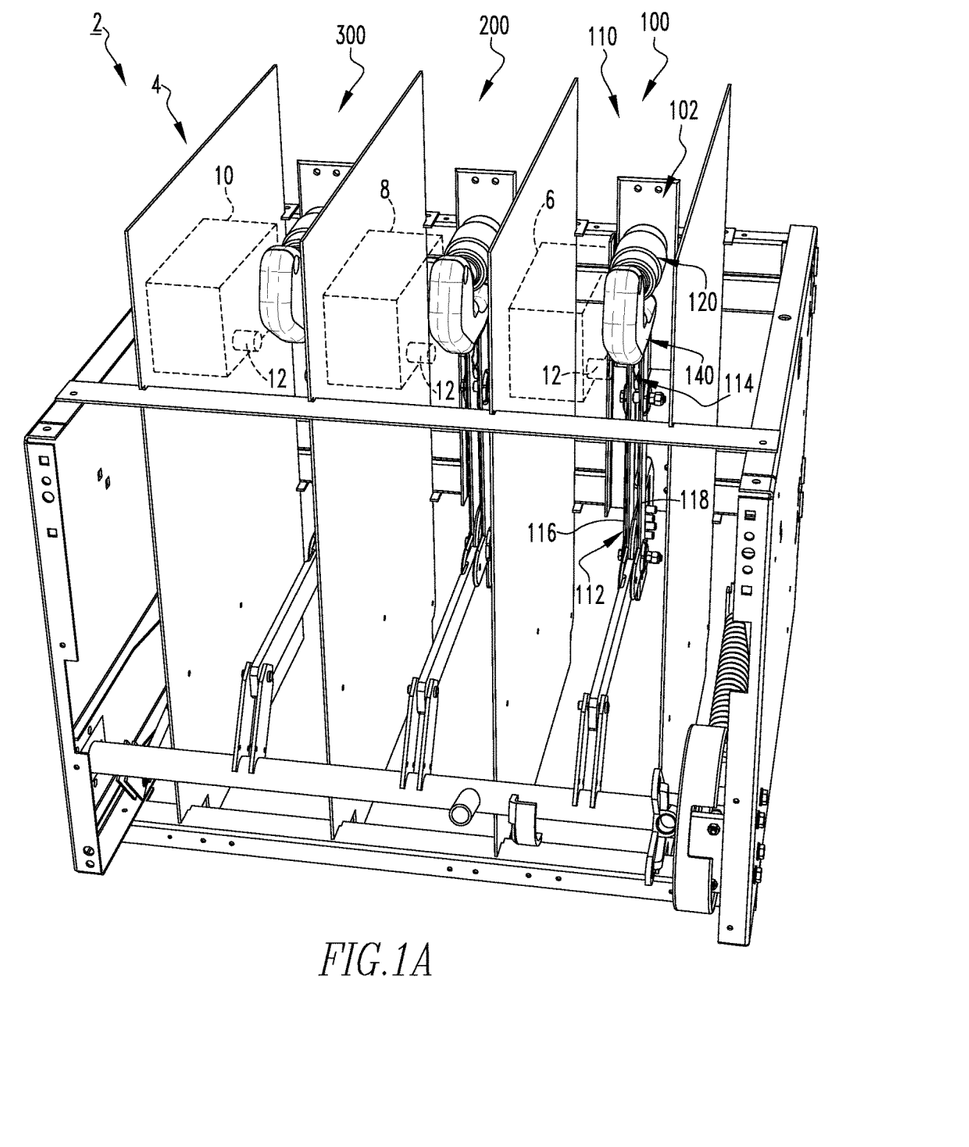
FIG. 1A shows an isometric view of a component for an electric power system and contact assembly therefor, shown with a switching assembly of the contact assembly in a first position corresponding to power being connected, in accordance with a non-limiting embodiment of the disclosed concept.

FIG. 1A shows an isometric view of a component (e.g., load break switch 2) for an electric power system in a first position corresponding to power being connected. The load break switch 2 includes a mounting assembly 4 and a number of contact assemblies 100,200,300. The mounting assembly 4 includes a number of mounting members 6,8,10 (shown in simplified form). For ease of illustration and economy of disclosure, only the contact assembly 100 and the mounting member 6 will be described in greater detail herein, although it will be appreciated that the contact assemblies 200,300 and the mounting members 8,10 are substantially the same, and configured substantially the same, as the contact assembly 100 and the mounting member 6.

The contact assembly 100 includes a bus member 102 coupled to the mounting member 6, and a switching assembly 110. The switching assembly 110 includes a movable contact (e.g., switchblade 112), a stationary contact 114, a switching device (e.g., vacuum interrupter 120), and a conductive member (e.g., retention member 140). The switching assembly 110 is structured to move between the first position (FIG. 1A) corresponding to power being connected and a second position (shown in FIG. 1B) corresponding to power being disconnected.

Figure 2A:
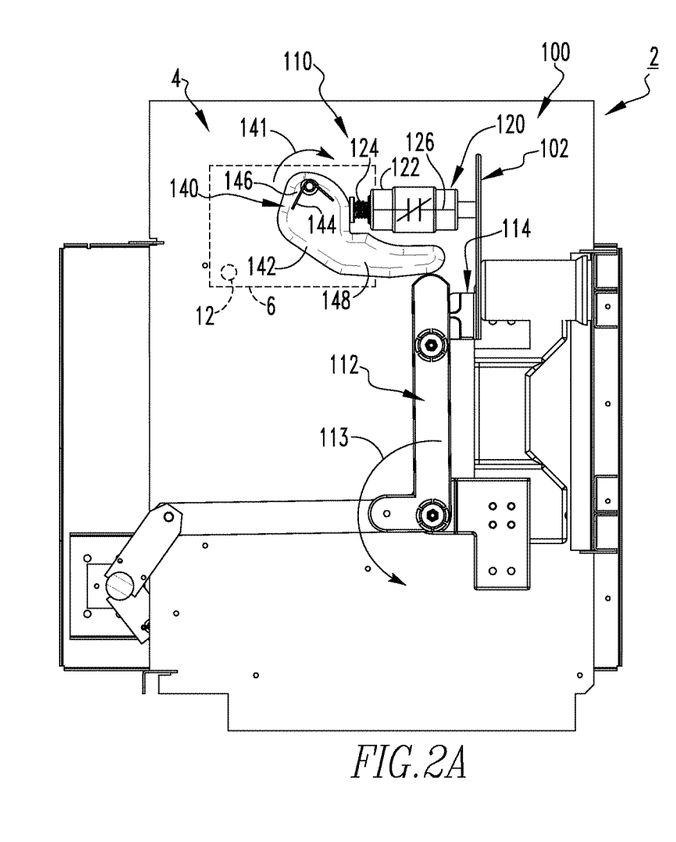
FIG. 2A shows a side elevation view of the component and contact assembly therefor of FIG. 1A, shown with a portion of the component removed in order to see hidden structures.
Figure 2B:
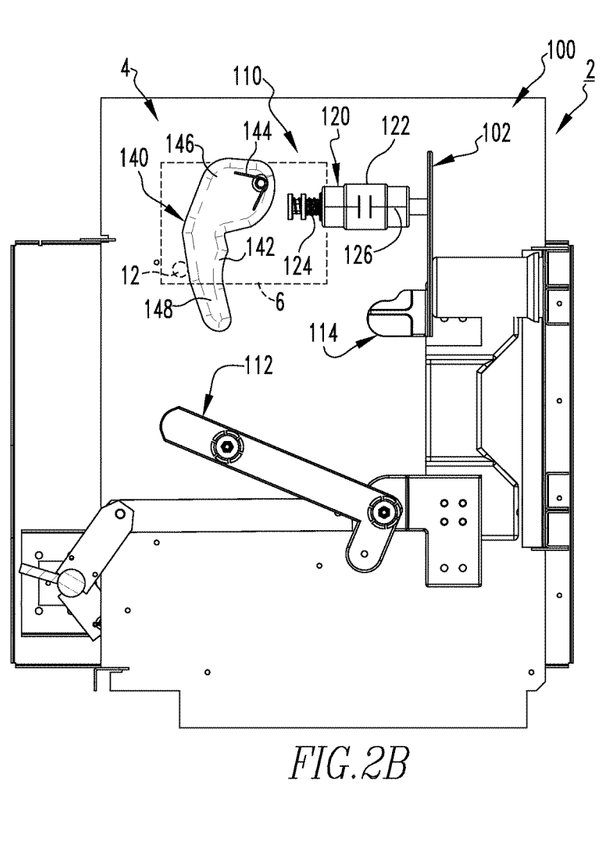
FIG. 2B shows a side elevation view of the component and contact assembly therefor of FIG. 2A, shown with the switching assembly in the second position.

FIGS. 2A and 2B show side elevation views of the load break switch 2 when the switching assembly 110 is in the first position and the second position, respectively. The vacuum interrupter 120 includes a body 122, a number of biasing elements (e.g., spring 124) coupled to the body 122, and a pair of separable contacts 126 (shown in simplified form) located internal the body 122. As shown, the pair of separable contacts 126 are closed when the switching assembly 110 is in the first position (FIG. 2A) and open when the switching assembly 110 is in the second position (FIG. 2B). Accordingly, current freely flows through the vacuum interrupter 120 when the switching assembly 110 is in the first position and does not flow through the vacuum interrupter 120 when the switching assembly 110 is in the second position (FIG. 2B).

The stationary contact 114 extends from the bus member 102 and is therefore structured to be electrically connected to the bus member 102. The vacuum interrupter 120 is coupled to the bus member 102 and is structured to be electrically connected to the bus member 102. As shown in FIG. 2A, when the switching assembly 110 is in the first position, the switchblade 112 engages the stationary contact 114, and the retention member 140 engages both the vacuum interrupter 120 and the switchblade 112. Thus, when the switching assembly 110 is in the first position (FIG. 2A), the retention member 140 provides an electrical pathway between the vacuum interrupter 120 and the switchblade 112. More precisely, parallel electrical pathways are advantageously provided between the bus member 102 and the switchblade 112. That is, when the switching assembly 110 is in the first position (FIG. 2A), current flows freely from the bus member 102 through the stationary contact 114 and into the switchblade 112, as well as from the bus member 102 through the vacuum interrupter 120 and the retention member 140 and into the switchblade 112.

As will be discussed in greater detail below, when the switching assembly 110 moves from the first position (FIG. 2A) toward the second position (FIG. 2B) (i.e., when the load break switch 2 opens), the vacuum interrupter 120 disconnects power after the switchblade 112 disengages the stationary contact 114 in order that electrical disconnection occurs within the vacuum interrupter 120. In this manner, while load current is flowing from the bus member 102 to the switchblade 112, and the load break switch 2 is opened, open air arcing is eliminated, as the switching energies associated with electrical disconnection are advantageously contained within the body 122 of the vacuum interrupter. As a result of elimination of open air arcing during opening, operating conditions associated with the load break switch 2 are significantly safer. Furthermore, prior art methods involving flicker blades to extinguish open air arcing are advantageously replaced by the vacuum interrupter 120 and the retention member 140. Accordingly, the length of the switchblade 112 is relatively small compared to prior art switchblades (not shown), and the life of the switchblade 112 in the load break switch 2 is significantly longer, as there is no wearing on the switchblade 112 due to an interaction with a flicker blade. As a result, material can be saved and manufacturing costs thereby reduced.

Figure 3A:
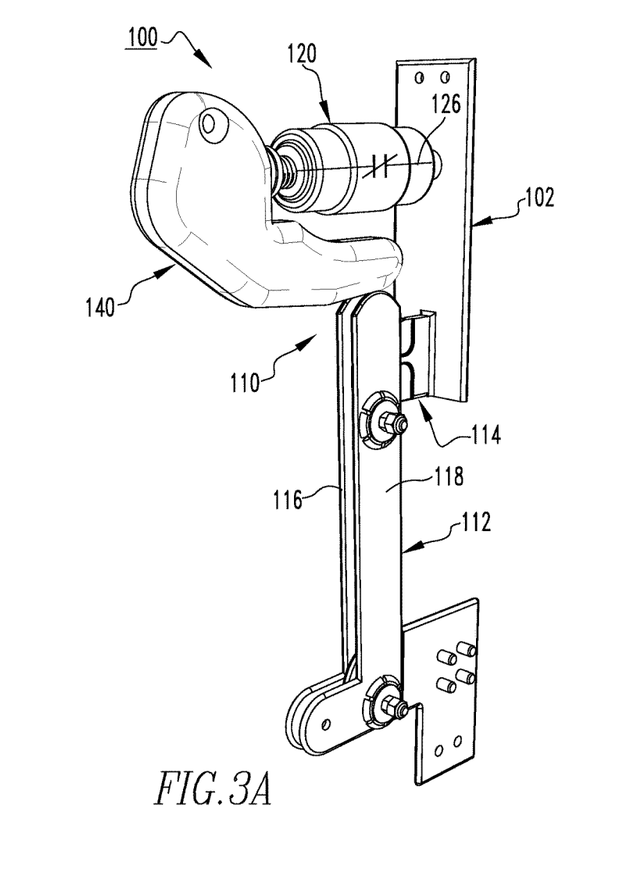
FIGS. 3A and 3B show isometric and side elevation views, respectively, of the contact assembly of FIG. 1A.
Figure 3B:
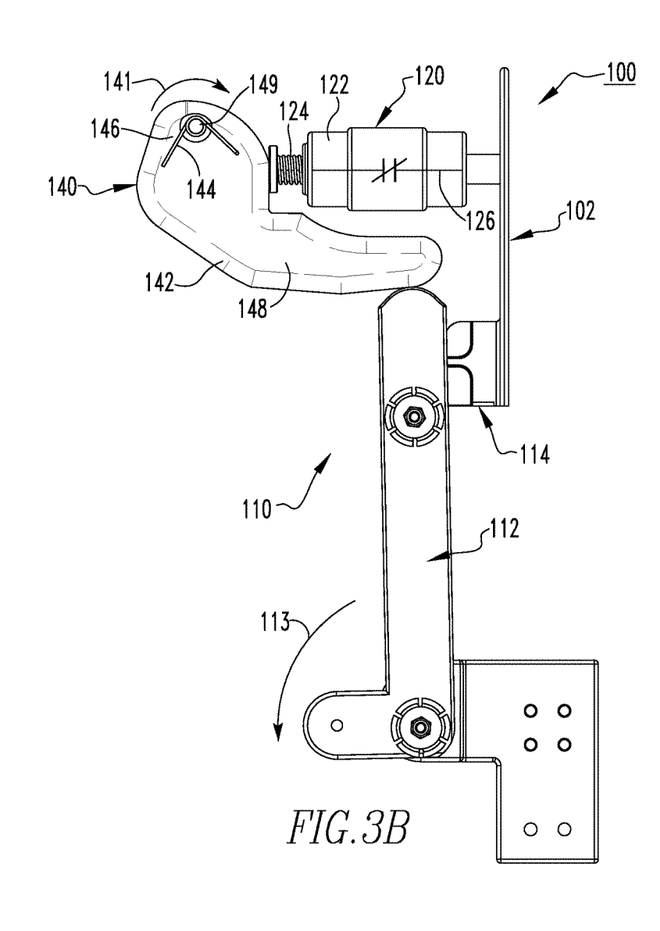

FIGS. 3A and 3B show isometric and side elevation views, respectively, of the contact assembly 100 when the switching assembly 110 is in the first position. Referring to FIG. 3A, the switchblade 112 includes a first conductive member 116 and a second conductive member 118 mechanically coupled to and generally parallel to the first conductive member 116. It will be appreciated that when the switching assembly 110 is in the first position, the stationary contact 114 is located between the first conductive member 116 and the second conductive member 118. As shown in FIG. 3B, the retention member 140 includes a body 142 and a number of biasing elements (e.g., torsion spring 144) (shown in simplified form) coupled to the body 142. The body 142 has a base portion 146 and an elongated portion 148 extending away from the base portion 146. When the switching assembly 110 is in the first position, the base portion 146 engages the vacuum interrupter 120 and the elongated portion 148 engages the switchblade 112 in order to maintain the vacuum interrupter 120 in the first position.

More specifically, the spring 124 of the vacuum interrupter 120 biases the pair of separable contacts 126 toward being open, and when the switching assembly 110 is in the first position the retention member 140 engages the vacuum interrupter 120 in order to force the pair of separable contacts 126 to be closed. The retention member 140 is pivotably coupled to the mounting member 6 (FIG. 1A) and is structured to pivot about a pivoting location 149. Continuing to refer to FIG. 3B, the torsion spring 144 biases the retention member 140 in a direction 141, which in the depicted orientation is clockwise. Thus, it will be appreciated that when the retention member 140 rotates in the direction 141 about the pivoting location 149 (i.e., when the switching assembly 110 moves from the first position (FIGS. 3A and 3B) toward the second position (shown in FIG. 3E)), the retention member 140 moves away from the vacuum interrupter 120, thereby allowing the vacuum interrupter 120 to disconnect power. In other words, the torsion spring 144 biases the retention member 140 away from engagement with the vacuum interrupter 120. When the switching assembly 110 is in the first position, the switchblade 112 is located generally perpendicular with respect to the elongated portion 148 of the retention member 140, thereby exerting a moment on the retention member 140 opposite the moment exerted by the torsion spring 144. As such, when the switching assembly 110 is in the first position, the switchblade 112 forces the retention member 140 into engagement with the vacuum interrupter 120.

Figure 3C:
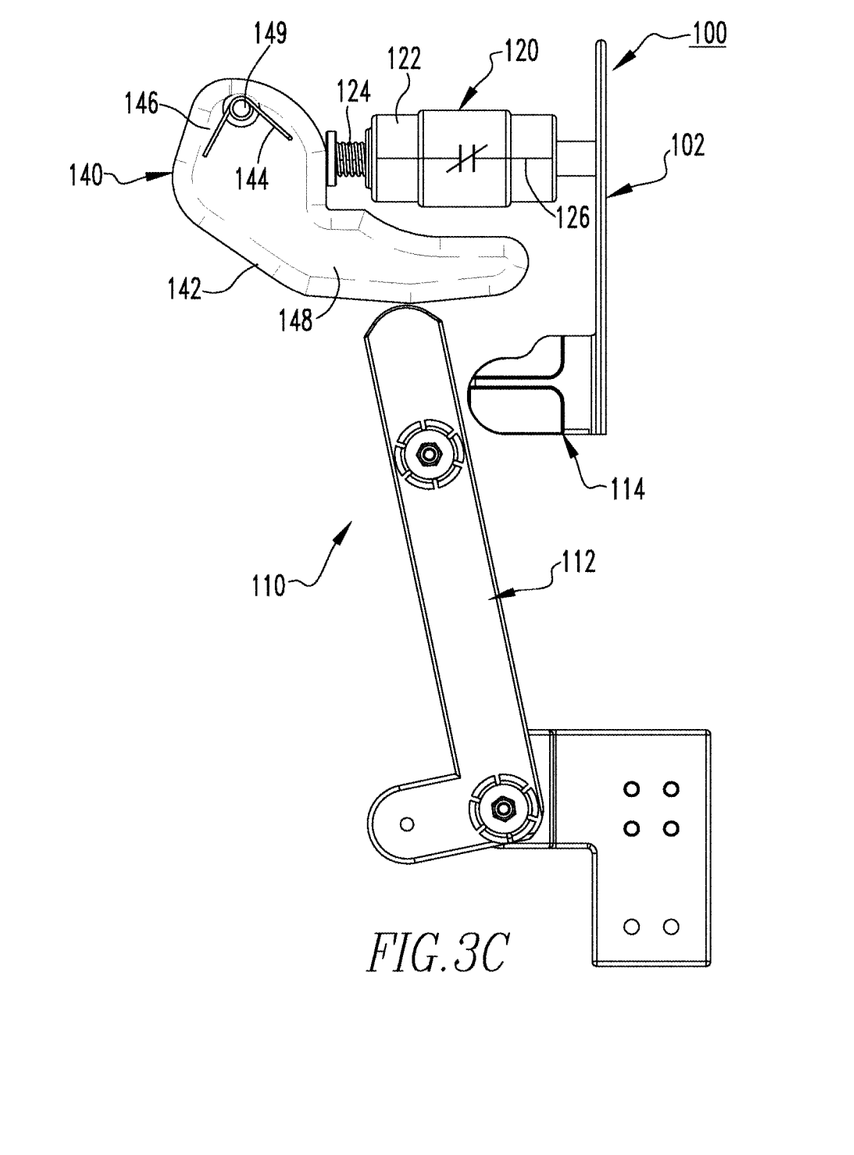
FIGS. 3C and 3D show side elevation views of the contact assembly of FIG. 1A, shown with the switching assembly in third and fourth positions, respectively, between the first position and the second position.

When the load break switch (FIGS. 1A-2B) opens and the switching assembly 110 moves from the first position (FIGS. 3A and 3B) toward the second position (shown in FIG. 3E), the switchblade 112 rotates in a direction 113 (shown in FIG. 3B) away from the stationary contact 114 and eventually disengages the stationary contact 114. FIG. 3C shows the contact assembly 100 when the switching assembly 110 is in a third position corresponding to the switchblade 112 having moved away from the stationary contact 114. Because the vacuum interrupter 120 and the stationary contact 114 are electrically connected in parallel with the bus member 102 and the switchblade 112 when the switching assembly 110 is in the first position (FIGS. 3A and 3B), current still freely flows from the bus member 102 to the switchblade 112 when the switching assembly 110 is in the third position (FIG. 3C). More specifically, in the third position (FIG. 3C), current freely flows from the bus member 102 through the vacuum interrupter 120 and the retention member 140 and into the switchblade 112. However, in the third position, current no longer flows through a second parallel electrical pathway directly between the stationary contact 114 and the switchblade 112 because of the disengagement between the switchblade 112 and the stationary contact 114.

As the switchblade 112 continues to open (i.e., move away from the stationary contact 114 in the direction 113), the retention member 140 pivots about the pivoting location 149. More specifically, the torsion spring 144 of the retention member, and the spring 124 of the vacuum interrupter 120, each have a predetermined quantity of stored energy when the switching assembly 110 is in the first position (FIGS. 3A and 3B). When the switchblade 112 opens, the force exerted on the retention member 140 by the switchblade 112 begins to decrease and eventually, when the switchblade 112 disengages the retention member 140, becomes zero. As this force, which previously maintained the retention member 140 in the first position, decreases, the stored energy of the springs 124,144 is released. In this manner, when the switching assembly 110 moves from the first position (FIGS. 3A and 3B) toward the second position (FIG. 3E), the retention member 140 rotates in the direction 141 (shown in FIG. 3B) opposite the direction 113.

Figure 3D:
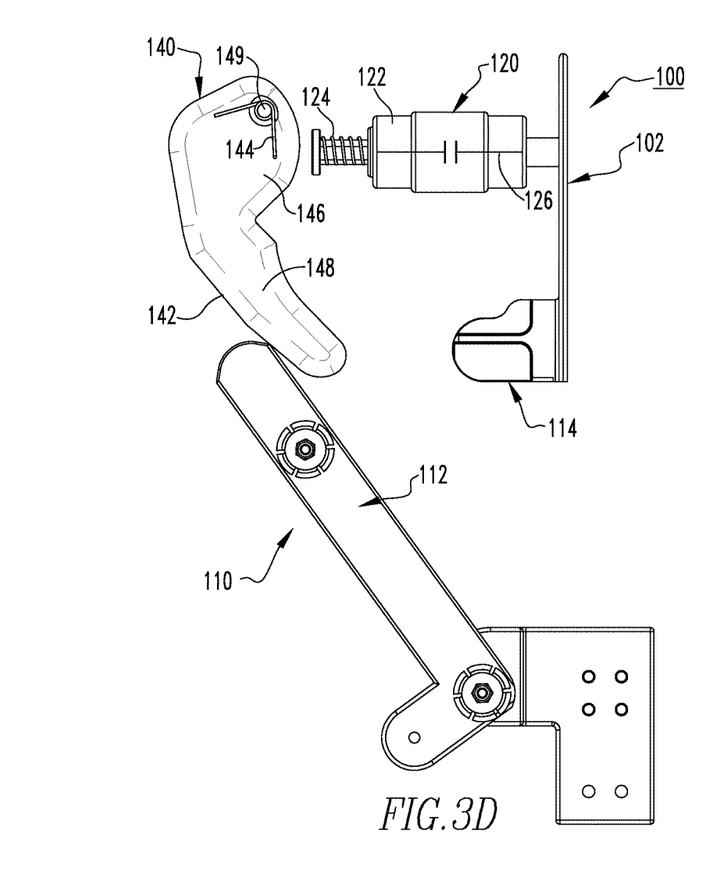

FIG. 3D shows the contact assembly 100 when the switching assembly 110 is in a fourth position corresponding to the switchblade 112 having moved a greater distance away from the stationary contact 114 than its position when the switching assembly 110 was in the third position (FIG. 3C). When the switching assembly 110 moves from the third position (FIG. 3C) toward the fourth position (FIG. 3D), the pair of separable contacts 126 of the vacuum interrupter 120 open within the body 122 of the vacuum interrupter 120. At this point, switching energies associated with electrical disconnection are advantageously able to be contained within the body 122 of the vacuum interrupter, thereby eliminating the possibility for open air arcing within the load break switch 2 (FIGS. 1A-2A).

Figure 3E:
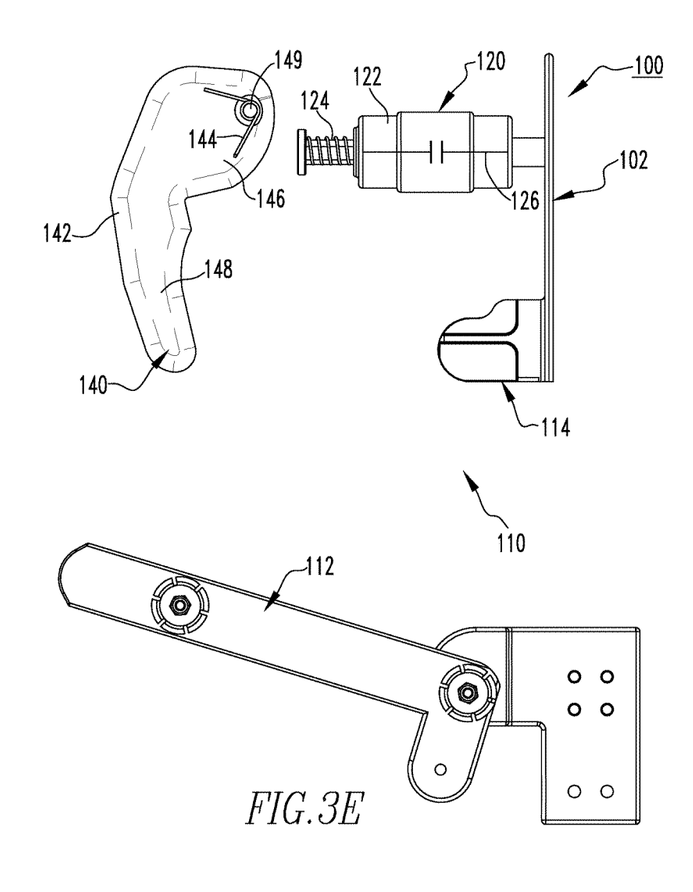
FIG. 3E shows a side elevation view of the contact assembly of FIG. 1A, shown with the switching assembly in the second position.

When the switching assembly 110 moves from the fourth position (FIG. 3D) toward the second position (FIG. 3E), the switchblade 112 continues to move away from the stationary contact 114 and eventually disengages the retention member 140 (see FIG. 3E, showing the switchblade 112 and the retention member 140 not engaging one another). In this manner, when the switching assembly 110 moves from the first position (FIGS. 3A and 3B) toward the second position (FIG. 3E), the retention member 140 disengages the switchblade 112 after the vacuum interrupter 120 disconnects power in order that electrical disconnection occurs within the vacuum interrupter 120. Additionally, referring again to FIG. 2B, in the exemplary non-limiting embodiment, the mounting assembly 4 further includes a blocking member (e.g., stopper 12) (shown in simplified form) coupled to the mounting member 6. As shown, when the switching assembly 110 is in the second position, the retention member engages the stopper 12, advantageously preventing over rotation of the retention member 140 and also maintaining the retention member 140 in the second position.

Figure 1B:
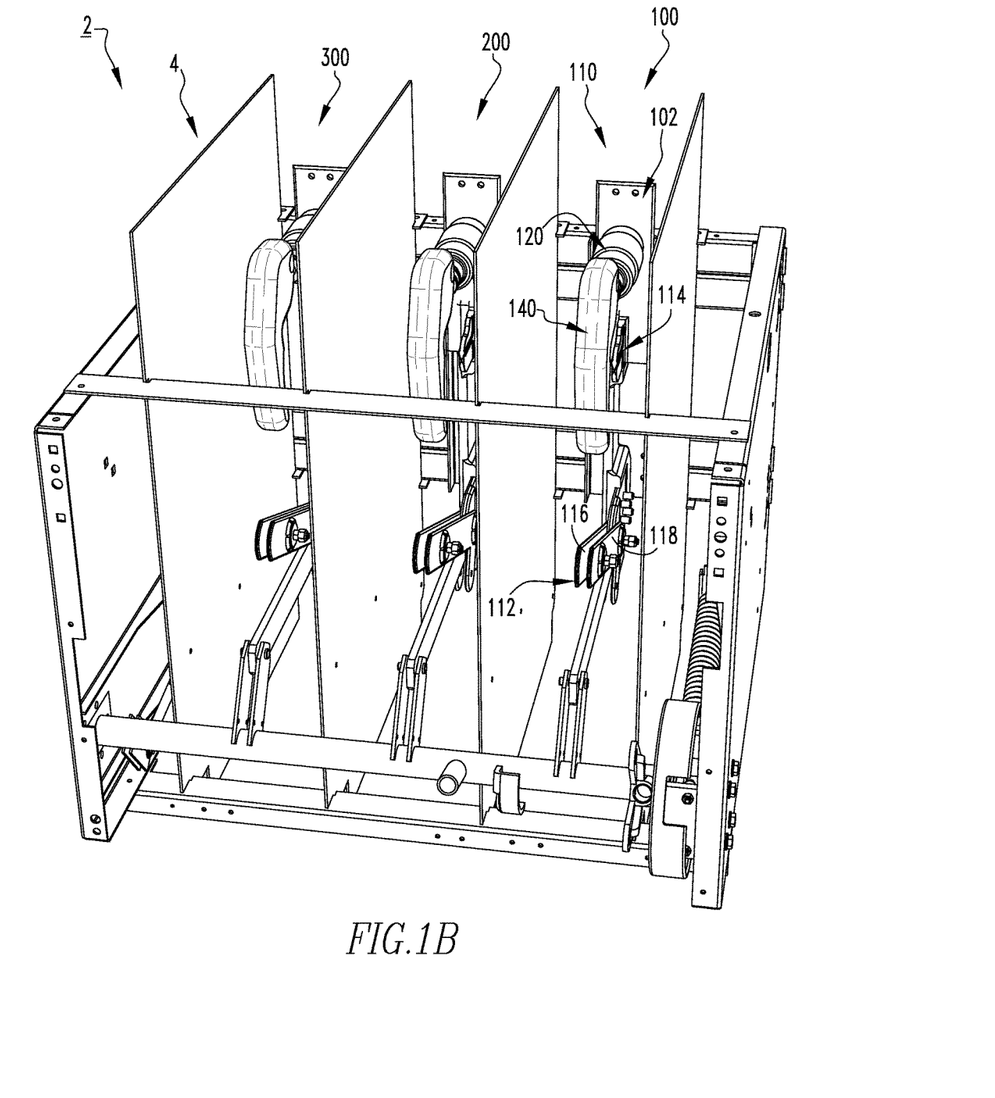
FIG. 1B shows an isometric view of the portion of the component and contact assembly therefor of FIG. 1A, shown with the switching assembly in a second position corresponding to power being disconnected.

It will be appreciated that a method of eliminating open air arcing within the load break switch 2 (FIGS. 1A-2A) includes the steps of: mechanically engaging the switchblade 112 with the stationary contact 114; electrically connecting the vacuum interrupter 120 and the stationary contact 114 in parallel with the bus member 102 and the switchblade 112; responsive to a trip condition, disengaging the switchblade 112 from the stationary contact 114; and disconnecting power with the vacuum interrupter 120 after the switchblade 112 disengages the stationary contact 114 in order that electrical disconnection occurs within the vacuum interrupter 120. The mechanically engaging step further includes the step of mechanically engaging the retention member 140 with the vacuum interrupter 120 and the switchblade 112. The disengaging step further includes rotating the switchblade 112 in a first direction 113, thereby allowing the retention member 140 to rotate in a second direction 141 opposite the first direction 113 in order to allow the vacuum interrupter 120 to disconnect power. The disconnecting step further includes the step of moving the pair of separable contacts 126 of the vacuum interrupter 120 from a closed position to an open position in order that electrical disconnection occurs within the body 122 of the vacuum interrupter 120. The disengaging step further includes the step of releasing the predetermined quantity of stored energy of the spring 124 and the torsion spring 144 in order to allow the vacuum interrupter 120 to disconnect power. Finally, the method further includes the step of disengaging the retention member 140 from the switchblade 112 after the vacuum interrupter 120 disconnects power in order that electrical disconnection occurs within the vacuum interrupter 120.

When the switching assembly 110 moves from the second position (FIG. 3E) toward the first position (FIGS. 3A and 3B) (i.e., during closing of the load break switch 2), the switchblade 112 drives the retention member 140 into the vacuum interrupter 120 in order to close the pair of separable contacts 126. Because the closing operation involves relatively large amounts of force being applied to the switchblade 112, the pair of separable contacts 126 close at nearly the same instant in time as the switchblade 112 re-engages the stationary contact 114. In this manner, the contact assembly 100 advantageously ensures that during the closing operation, current will first flow from the switchblade 112 to the stationary contact 114 (i.e., the path of least resistance), and then flow in the parallel electrical pathway of the retention member 140 and the vacuum interrupter 120. As a result, the vacuum interrupter 120 is advantageously able to be relatively small, as the largest currents it will experience are during the opening operation.

More specifically, in one embodiment the load break switch 2 is structured so that when it is closed it can withstand fault current up to about 40,000 amperes, and when it is opened it interrupts (i.e., breaks) normal load operating current up to about 1200 amperes. Accordingly, in the exemplary embodiment, the largest currents experienced by the vacuum interrupter will be around 1200 amperes. Employing a relatively small switching device such as the vacuum interrupter 120 advantageously reduces cost and saves space.

Although the disclosed concept has been described in detail herein in association with the retention member 140, it will be appreciated that a switching assembly (not shown) may employ any suitable alternative conductive member (not shown), in order to perform the desired function of providing an electrical pathway between the vacuum interrupter 120 and the switchblade 112.

Accordingly, it will be appreciated that the disclosed concept provides for an improved (e.g., without limitation, safer, longer lasting) component 2 for an electric power system, and contact assembly 100,200,300 and open air arc elimination method therefor, which among other benefits, allows electrical disconnection during opening of the component 2 to occur within a switching device 120 in parallel with a stationary contact 114, therefore allowing switching energies to be contained within the switching device 120. As a result, open air arcing within the component 2 is eliminated, thereby improving safety and lengthening the life of a movable contact 112 of the contact assembly 100.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A contact assembly for a component of an electric power system, said component comprising a mounting assembly including a mounting member, said contact assembly comprising:
   a bus member structured to be coupled to said mounting member; and
   a switching assembly structured to move between a first position corresponding to power being connected and a second position corresponding to power being disconnected, said switching assembly comprising:
      a stationary contact extending from said bus member,
      a movable contact structured to engage said stationary contact when said switching assembly is in the first position and disengage said stationary contact when said switching assembly moves toward the second position, and
      a switching device coupled to said bus member;
   wherein, when said switching assembly is in the first position, said switching device and said stationary contact are electrically connected in parallel with said bus member and said movable contact;
   wherein, when said switching assembly moves from the first position toward the second position, said switching device disconnects power after said movable contact disengages said stationary contact in order that electrical disconnection occurs within said switching device;
   wherein said switching assembly further comprises a retention member structured to be coupled to said mounting member; wherein, when said switching assembly is in the first position, said retention member engages said switching device and said movable contact in order to maintain said switching device in the first position;
   wherein said retention member is structured to be pivotably coupled to said mounting member; wherein, when said switching assembly moves from the first position toward the second position, said retention member rotates in a first direction; wherein, when said switching assembly moves from the first position toward the second position, said movable contact rotates in a second direction opposite the first direction: wherein, when said switching assembly moves from the first position toward the second position, said retention member moves away from engagement with said switching device in order to allow said switching device to disconnect power; wherein said retention member comprises a body and a number of biasing elements coupled thereto; wherein said number of biasing elements bias said retention member away from engagement with said switching device; and wherein, when said switching assembly is in the first position, said movable contact forces said retention member into engagement with said switching device.

2. The contact assembly of claim 1 wherein said number of biasing elements is a torsion spring.

3. A contact assembly for a component of an electric power system, said component comprising a mounting assembly including a mounting member, said contact assembly comprising:

a bus member structured to be coupled to said mounting member; and a switching assembly structured to move between a first position corresponding to power being connected and a second position corresponding to power being disconnected, said switching assembly comprising:

a stationary contact extending from said bus member, a movable contact structured to engage said stationary contact when said switching assembly is in the first position and disengage said stationary contact when said switching assembly moves toward the second position, and a switching device coupled to said bus member;

wherein, when said switching assembly is in the first position, said switching device and said stationary contact are electrically connected in parallel with said bus member and said movable contact;

wherein, when said switching assembly moves from the first position toward the second position, said switching device disconnects power after said movable contact disengages said stationary contact in order that electrical disconnection occurs within said switching device;

wherein said switching assembly further comprises a retention member structured to be coupled to said mounting member; wherein, when said switching assembly is in the first position, said retention member engages said switching device and said movable contact in order to maintain said switching device in the first position;

wherein said retention member is structured to be pivotably coupled to said mounting member; wherein, when said switching assembly moves from the first position toward the second position, said retention member rotates in a first direction, wherein, when said switching assembly moves from the first position toward the second position, said movable contact rotates in a second direction opposite the first direction; wherein, when said switching assembly moves from the first position toward the second position, said retention member moves away from engagement with said switching device in order to allow said switching device to disconnect power; wherein, when said switching assembly is in the first position, said retention member provides an electrical pathway between said switching device and said movable contact; and wherein, when said switching assembly moves from the first position toward the second position, said retention member disengages said movable contact after said switching device disconnects power in order that electrical disconnection occurs within said switching device.

4. The contact assembly of claim 3 wherein said switching device comprises a body, a pair of separable contacts disposed internal the body, and a number of biasing elements coupled to the body; wherein the pair of separable contacts of said switching device are closed when said switching assembly is in the first position and open when said switching assembly is in the second position; wherein, when said switching assembly is in the first position, said number of biasing elements bias the pair of separable contacts of said switching device toward being open; and wherein, when said switching assembly is in the first position, said retention member forces the pair of separable contacts of said switching device to be closed.

5. The contact assembly of claim 4 wherein, when said switching assembly moves from the second position toward the first position, said movable contact drives said retention member into said switching device in order to close the pair of separable contacts of said switching device.

6. The contact assembly of claim 3 wherein said retention member comprises a body having a base portion and an elongated portion extending away from the base portion; wherein, when said switching assembly is in the first position, the elongated portion engages said movable contact and is disposed generally perpendicular with respect thereto; and wherein, when said switching assembly is in the first position, the base portion engages said switching device.

7. The contact assembly of claim 3 wherein said switching device is a vacuum interrupter.

8. A component for an electric power system, said component comprising:

a mounting assembly including at least one mounting member; and at least one contact assembly comprising:

a bus member coupled to said at least one mounting member, and a switching assembly structured to move between a first position corresponding to power being connected and a second position corresponding to power being disconnected, said switching assembly comprising:

a stationary contact extending from said bus member, a movable contact structured to engage said stationary contact when said switching assembly is in the first position and disengage said stationary contact when said switching assembly moves toward the second position, and a switching device coupled to said bus member;

wherein, when said switching assembly is in the first position, said switching device and said stationary contact are electrically connected in parallel with said bus member and said movable contact;

wherein, when said switching assembly moves from the first position toward the second position, said switching device disconnects power after said movable contact disengages said stationary contact in order that electrical disconnection occurs within said switching device;

wherein said switching assembly further comprises a retention member coupled to said at least one mounting member; wherein, when said switching assembly is in the first position, said retention member engages said switching device and said movable contact in order to maintain said switching device in the first position;

wherein said retention member is pivotably coupled to said at least one mounting member; wherein, when said switching assembly moves from the first position toward the second position, said retention member rotates in a first direction; wherein, when said switching assembly moves from the first position toward the second position, said movable contact rotates in a second direction opposite the first direction; wherein, when said switching assembly moves from the first position toward the second position, said retention member moves away from engagement with said switching device in order to allow said switching device to disconnect power, wherein said retention member comprises a body and a number of biasing elements coupled thereto; wherein said number of biasing elements bias said retention member away from engagement with said switching device; and wherein, when said switching assembly is in the first position, said movable contact forces said retention member into engagement with said switching device.

9. The component of claim 8 wherein said at least one mounting member is a plurality of mounting members; wherein said at least one contact assembly is a plurality of contact assemblies; and wherein said component is a load break switch.

10. A method of eliminating open air arcing within a component of an electric power system, said component comprising a mounting member and a contact assembly, said contact assembly comprising a bus member and a switching assembly, said bus member being coupled to said mounting member, said switching assembly comprising a stationary contact extending from said bus member, a movable contact, a switching device coupled to said bus member, and a retention member coupled to said mounting member, the method comprising the steps of:
   mechanically engaging said movable contact with said stationary contact;
   mechanically engaging said retention member with said switching device and said movable contact;
   electrically connecting said switching device and said stationary contact in parallel with said bus member and said movable contact;
   responsive to a trip condition, disengaging said movable contact from said stationary contact;
   rotating said movable contact in a first direction, thereby allowing said retention member to rotate in a second direction opposite the first direction;
   moving said retention member away from engagement with said switching device when said movable contact rotates in the first direction;
   disconnecting power with said switching device after said movable contact disengages said stationary contact in order that electrical disconnection occurs within said switching device; and
   disengaging said retention member from said movable contact after said switching device disconnects power in order that electrical disconnection occurs within said switching device.

11. The method of claim 10 wherein said switching device is a vacuum interrupter comprising a body and a pair of separable contacts disposed internal the body; and wherein the disconnecting step further comprises the step of:
   moving the pair of separable contacts of said vacuum interrupter from a closed position to an open position in order that electrical disconnection occurs within the body of said vacuum interrupter.

12. The method of claim 10 wherein said switching device comprises a body and a number of biasing elements coupled thereto; wherein said retention member comprises a body and a number of biasing elements coupled thereto; wherein, when said movable contact engages said stationary contact, said number of biasing elements of said switching device and said number of biasing elements of said retention member have a predetermined quantity of stored energy; and wherein the disengaging step further comprises the step of:
   releasing the predetermined quantity of stored energy in order to allow said switching device to disconnect power.

* * * * *